US005198635A

United States Patent [19]

Dankovic et al.

[11] Patent Number: 5,198,635

[45] Date of Patent: Mar. 30, 1993

[54] PLASMA ARC WELDING ADAPTED TO ID ELLIPSOID PROCESS

[75] Inventors: Richard A. Dankovic, Massillon; Gregory P. Zolton, II, Fairlawn; John F. Bushkill, Canton; Louis S. Slimak, Doylestown, all of Ohio

[73] Assignee: The Babcock & Wilcox Company, New Orleans, La.

[21] Appl. No.: 715,956

[22] Filed: Jun. 17, 1991

[51] Int. Cl.[5] .................................... B23K 9/00

[52] U.S. Cl. .................... 219/121.46; 219/121.45; 219/121.5; 219/121.59

[58] Field of Search .................. 219/121.45, 121.46, 219/121.59, 121.5, 121.52, 75, 121.39, 121.44

[56] References Cited

U.S. PATENT DOCUMENTS

| | | | |
|---|---|---|---|
| 4,415,795 | 11/1983 | Ross et al. | 219/121.39 |
| 4,423,304 | 12/1983 | Bass et al. | 219/121.52 |
| 4,831,231 | 5/1989 | Pelle | 219/121.39 |
| 4,843,208 | 6/1989 | French et al. | 219/121.39 |
| 5,006,687 | 4/1991 | Fujita et al. | 219/121.59 |

*Primary Examiner*—Mark H. Paschall
*Attorney, Agent, or Firm*—Robert J. Edwards; Michael L. Hoelter

[57] ABSTRACT

This invention pertains to the use of a plasma arc welding technique when welding a nozzle to the interior of a vessel. More specifically, it pertains to a method and apparatus for making an inside weld when access to the interior of the vessel is restricted.

21 Claims, 3 Drawing Sheets

PLASMA ARC WELDING ADAPTED TO ID ELLIPSOID PROCESS

FIELD OF THE INVENTION

This invention pertains to the welding of nozzles or other devices to a pressure vessel and more specifically to the use of plasma arc welding techniques for welding this nozzle to the inside of the vessel when such access is restricted.

BACKGROUND OF THE INVENTION

In power generation and other industries, it often becomes necessary to attach nozzles (such as replacement heater nozzles) or other devices to pressure vessels. Generally, these nozzles are welded in place with a strength weld on the outside of the vessel and with a seal weld on the inside of the vessel. However, applying a strength weld (one requiring the addition of filler material) on both sides of the vessel is also a common practice, it just being a more complicated procedure.

As can be imagined, the weld on the outside of the vessel is quite accessible. Unfortunately, the same cannot be said of the inside weld since access to the inside of the vessel is often limited to the small opening of the nozzle itself. This is due to the potential radiation fields or other hazards or limitations on access commonly encountered within such vessels.

To make these inner welds, an internal seal welder was developed which provides a method for remotely making the inside weld from the outside of the vessel. This seal welder reaches up through the nozzle with a gas tungsten arc welding torch, normally referred to as a TIG torch, which is manipulated to follow the curved path around the nozzle end. The exact path to be followed (circular, ellipsoid, etc.) is a function of both the circular nozzle end and the angle of its intersection with the inside of the pressure vessel. It was thus hoped that the seal welder would consistently and repetitively yield an acceptable weld.

Unfortunately, however, the use of a TIG welding torch introduces many more variables which must be understood and controlled before such consistency can be achieved. These variables include such items, among others, as a properly sharpened tungsten tip, consistent weld joint geometry, and consistent torch to workpiece distance. Additionally, in the event an interior strength weld is required (as compared with a seal weld), filler metal will also need to be supplied to the weld which presents its own set of problems in the confined space within the nozzle. Furthermore, the weld occurs some radial distance from the longitudinal axis of the nozzle, thus the welding torch and the filler metal will need to be angled and supplied accordingly.

It is thus an object of this invention to provide a means for seal welding as well as strength welding a replacement nozzle to the interior of a vessel from its outside. Another object of this invention is to utilize plasma arc welding techniques thereby avoiding the problems normally associated with the TIG process. A further object of this invention is to provide powdered metal filler rather than weld wire when strength welding is required. Still another object of this invention is to provide a means of welding which can better accommodate different joint geometry configurations and variations so that the torch-to-workpiece distance becomes less critical. Another object of this invention is to reduce set-up time, weld contamination and noise that are associated with TIG welding. A further object of this invention is to incorporate a smaller heat-affected zone than is normally possible with TIG welding thereby affecting (i.e. reducing the hardness of) a smaller portion of the surrounding material. These and other objects will become obvious upon further investigation.

SUMMARY OF THE INVENTION

This invention pertains to an apparatus and method for making an inside plasma arc weld that attaches a nozzle to a vessel when access to the interior of the vessel is restricted. The apparatus contains a plasma arc welding torch that is configured to fit within the nozzle to be welded. This torch has an approximately 90-degree bend at its discharge end so as to form a weld bead a preselected distance from the longitudinal axis of both the torch and the nozzle. Support means secure the torch to the nozzle with these means also aligning the torch with respect to the nozzle. Linear movement means and rotary movement means are synchronously controlled and operated to move the torch along the perimeter of the discharge end of the nozzle. This discharge end is usually elliptical in shape since it is often cut along a bias. While being so moved, the torch makes the plasma arc seal or strength weld (as desired) thereby securely attaching this discharge end of the nozzle to the vessel.

DETAILED DESCRIPTION OF THE DRAWINGS

Figure 1:
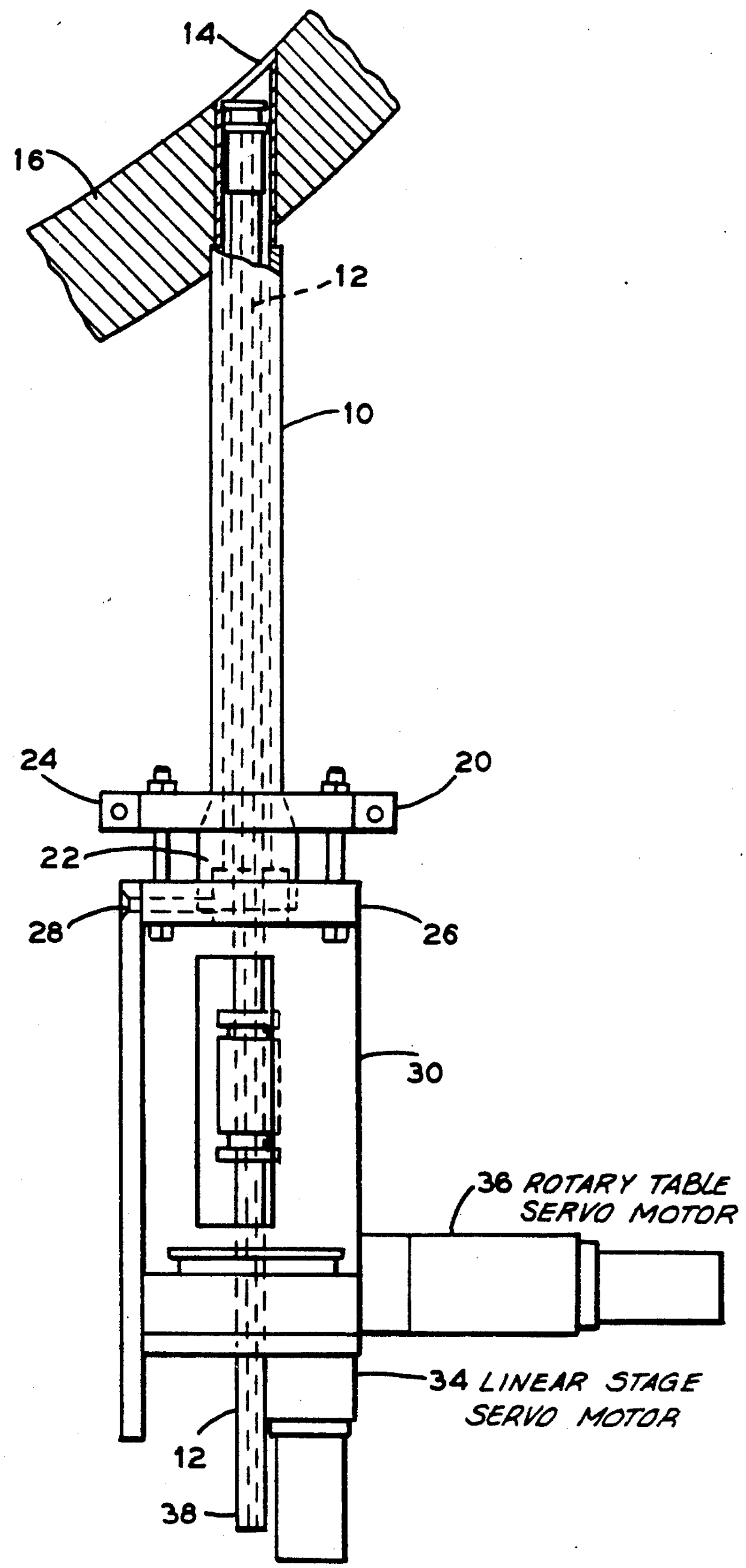
FIG. 1 is a schematic view, partially broken away, of the invention positioned within a replacement nozzle.

Referring to the drawings, there is shown replacement nozzle 10 with plasma arc welding torch assembly 12 positioned therein. Replacement nozzle 10 is inserted within opening 14 in pressure vessel 16 prior to being welded thereto. As can be seen, nozzle 10 and vessel 16 are angled with respect to each other, thus opening 14 is oftentimes ellipsoid in shape provided, of course, discharge end 18 of nozzle 10 is circular in shape. Other curves, however, are equally likely such as circular should nozzle 10 be inserted perpendicular to vessel 16.

In this embodiment, plasma arc welding torch assembly 12 is secured to replacement nozzle 10 via a series of clamps 20 which grip end region 22 of nozzle 10. Clamps 20 may grip nozzle 10 between split-ring clamp 24 and mounting plate 26 as shown or another means of fastening may be devised. In any event, a locating pin or key 28 properly aligns assembly 12 with respect to nozzle 10 for proper welding orientation.

Secured to mounting plate 26 is support housing 30 that contains the linear and rotary stages used to move welding torch head 32 (FIG. 3) either longitudinally or radially as needed. Linear movement is accomplished by linear stage servo motor 34 while rotary table servo motor 36 rotates torch head 32 about its longitudinal axis. Encoders attached to both motors 34 and 36 interpret the incoming signals for proper operation. Inlet end region 38 of plasma arc welding torch assembly 12 is connected to an independent power source, welding gases, powdered metal, and other supplies which are not shown but which are necessary for plasma arc welding to occur.

Thus as can be seen, torch head 32 is rotated about its longitudinal axis while simultaneously being moved linearly along this axis thereby closely following the perimeter of discharge end 18 of nozzle 10. During this movement, plasma arc welding torch assembly 12 is operated to weld discharge end 18 to pressure vessel 16.

Figure 2:
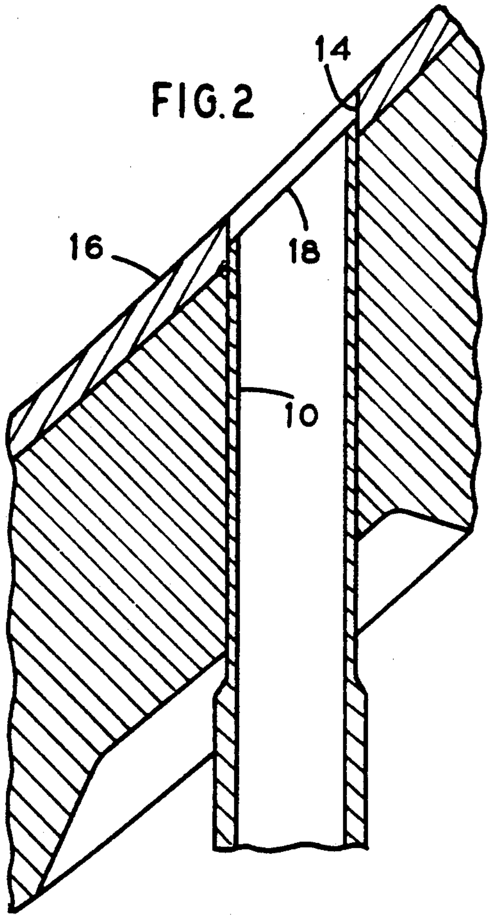
FIG. 2 is a sectional view, partially broken away, showing an inset nozzle end prior to being welded to the pressure vessel.
Figure 3:
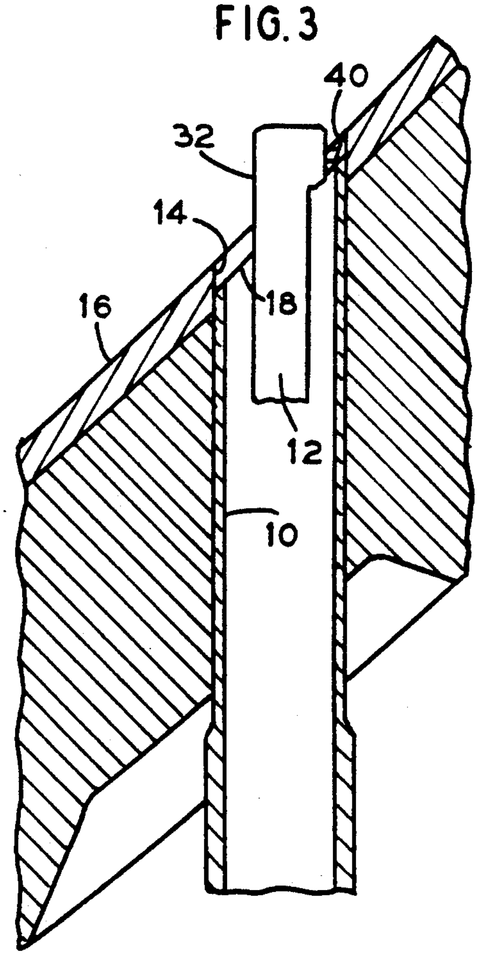
FIG. 3 is a sectional view, partially broken away, illustrating the welding operation and the torch head configuration needed for an inset nozzle end.
Figure 4:
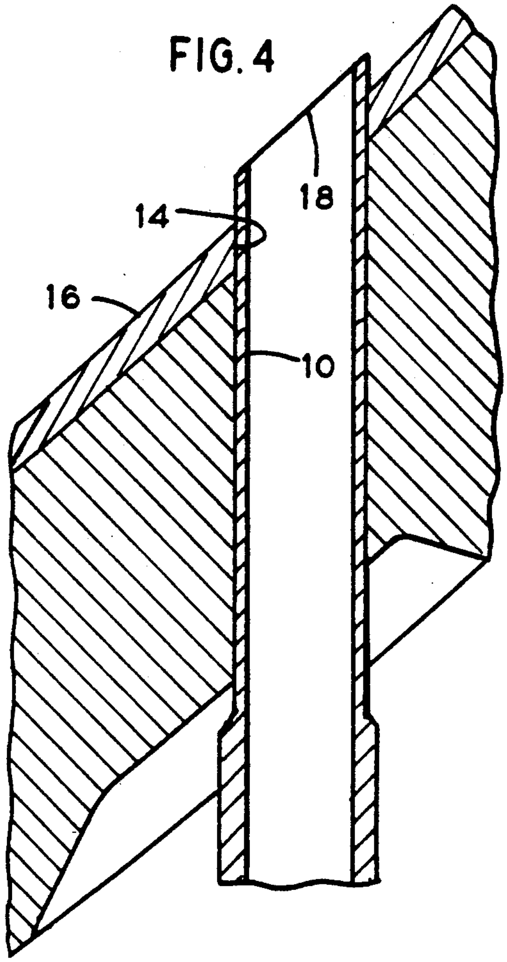
FIG. 4 is a sectional view, partially broken away, showing a projecting nozzle end prior to being welded to the pressure vessel.
Figure 5:
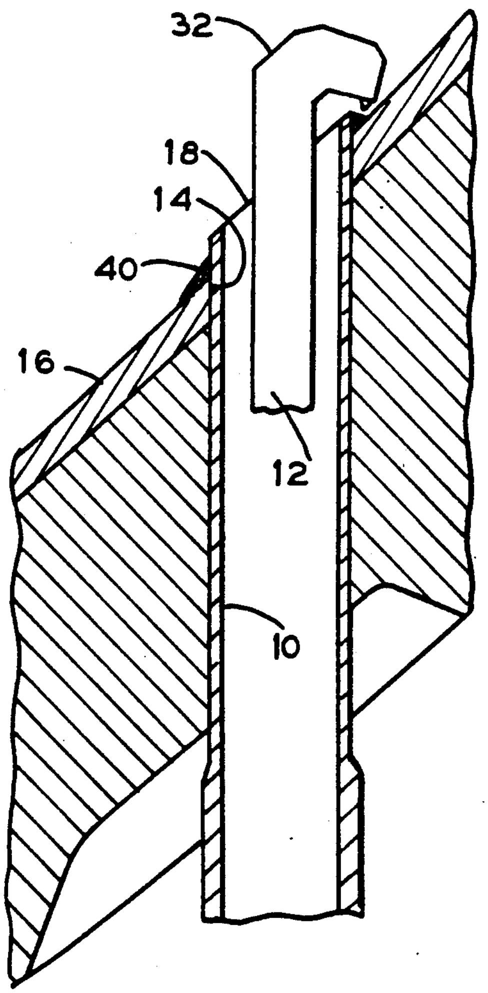
FIG. 5 is a sectional view, partially broken away, illustrating the welding operation and the torch head configuration needed for a projecting nozzle end.

Referring now more specifically to FIGS. 2–5, an enlarged view of nozzle end 18 and the wall of pressure vessel 16 is shown. Circular nozzle end 1 is bias cut at a specified angle, determined in accordance with the curvature of pressure vessel 16, thereby transcribing a curve (probably elliptical) at its outer end 18. In FIGS. 2 and 3, nozzle end 18 is shown inset slightly from the inside surface of vessel 16 thereby providing a space for weld 40. In FIGS. 4 and 5, however, nozzle end 18 is shown projecting beyond the inside surface of vessel 16 with weld 40 thereby being located as shown against the outside surface of the projecting portion.

Oftentimes, the wall thickness of pressure vessel 16 is about 3⅞ths inches with an additional ⅜ths inch of cladding material along its inside surface. This gives a total pressure vessel 16 wall thickness of about 4¼ inches. As stated above, nozzle end 18 can be inset a slight distance (about 3/16ths of an inch) from the inside surface so as to provide room for weld 40. Alternatively, nozzle end 18 can project a similar slight distance into pressure vessel 16 so as to provide sufficient room for weld 40. Of course, different dimensions may apply to different applications.

Referring now to FIG. 3, an approximately 90-degree (more or less) turn or bend of welding torch head 32 is disclosed. Since plasma arc welding requires gases and possibly powdered metal (for strength welding) for operation, it is a simple matter to construct a welding head that merely channels these fluids along this 90-degree turn. Thus, during the welding operation, torch head 32 is simultaneously rotated and moved longitudinally to continuously weld along the elliptical perimeter of nozzle end 18. As a result, weld bead 40 is formed at a generally uniform distance from the longitudinal axis of both torch head 32 and nozzle 10, more or less. Should this inside weld 40 need to be a strength weld and not merely a seal weld, then powdered metal can be supplied to torch head 32 in the proper quantity as required.

Referring to FIG. 5, a different configuration of torch head 32 is disclosed so as to accommodate a nozzle 10 that projects beyond the inside surface of vessel 16. The operation of this configuration would be the same as that shown in FIG. 3 but with a few more bends to it (it would still have an approximately 90 degree bend to it). The exact configuration of this type of torch head 32 being, of course, dependant upon the geometry of nozzle 10 and the distance it projects into vessel 16.

Referring now to linear stage servo motor 34, this motor is connected to torch assembly 12 and provides the up and down motion of torch head 32 required to follow the rise and fall of the curved end of nozzle 18. Rotary table servo motor 36 is likewise connected to torch assembly 12 and it controls the rotary table which allows a full 360 degree rotation of torch head 32 within nozzle end 18. These two motors 34 and 36 are synchronized so that the proper rotation, rise, and fall are controlled to obtain and maintain a proper welding speed and distance. Their servo motors precisely follow the commands of a motion controller which may be manually operated or, preferably, is operated by a computer or by other means. In the preferred embodiment, linear stage servo motor 34 utilizes a precision ball screw for linear motion while rotary table servo motor 36 utilizes a precision worm drive to provide the rotary motion. Consequently, in this embodiment, it can be said that all motions are accomplished mechanically.

The encoders attached to motors 34 and 36 monitor the movement of welding torch 32 and translate this motion into electronic signals which are used to monitor and direct the position of torch head 32 at any given time. As stated above, welding torch 32 is preferably computer controlled with a computer program being prepared for each nozzle location since elliptical opening 14 may vary from nozzle to nozzle. This program is loaded into the motion controller which synchronizes servo motors 34 and 36 thereby also controlling the movement of torch head 32.

What is claimed is:

1. An apparatus for plasma arc welding a nozzle to a vessel interior comprising:

(a) an elongated plasma arc welding torch configured to fit within but not engage the nozzle to be welded, said plasma arc welding torch having a discharge end oriented approximately 90-degrees with respect to its longitudinal axis for forming a weld bead a preselected distance from the longitudinal axis of both said welding torch and said nozzle;

(b) support means securing said torch within said nozzle from outside said vessel for supporting and co-axially aligning said torch with respect to said nozzle;

(c) linear movement means secured to said torch outside said nozzle for moving said torch along the longitudinal axis of said nozzle;

(d) rotary movement means secured to said torch outside said nozzle for rotating said torch about the longitudinal axis of said nozzle; and, (e) control means for simultaneously controlling and synchronizing said linear and rotary movement means to move said discharge end of said plasma arc welding torch along the perimeter of the discharge end of said nozzle thereby welding said discharge end of said nozzle to the vessel.

2. The apparatus as set forth in claim 1 wherein said discharge end of said nozzle is bias cut.

3. The apparatus as set forth in claim 1 wherein said nozzle is inset a slight distance from the interior surface of said vessel.

4. The apparatus as set forth in claim 1 wherein said nozzle projects a slight distance into the interior of said vessel.

5. The apparatus as set forth in claim wherein said support means comprise clamping means for clamping said torch to said nozzle.

6. The apparatus as set forth in claim 5 wherein said clamping means comprise a split collar.

7. The apparatus as set forth in claim 5 wherein said support means comprise alignment means for aligning said plasma arc welding torch with said nozzle.

8. The apparatus as set forth in claim 7 wherein said alignment means comprise a locating pin.

9. The apparatus as set forth in claim 7 wherein said linear movement means comprise a ball screw assembly.

10. The apparatus as set forth in claim 7 wherein said rotary movement means provide a full 360 degree of rotation of said discharge end of said welding torch within said nozzle.

11. The apparatus as set forth in claim 10 wherein said rotary movement means comprise a worm drive assembly.

12. The apparatus as set forth in claim 10 wherein said control means comprise at least one computer operated encoder.

13. The apparatus as set forth in claim 12 wherein the weld beam is a strength weld whereby powdered metal is supplied to said plasma arc welding torch.

14. A method of plasma arc welding a nozzle to the interior of a vessel from outside the vessel comprising the steps of:

(a) inserting an elongated plasma arc welding torch into but avoiding contact with the nozzle to be welded, said welding torch having a discharge end oriented approximately 90-degrees with respect to its longitudinal axis for forming a weld bead a preselected distance from the longitudinal axis of both said welding torch and said nozzle;

(b) supporting said welding torch from outside said vessel and co-axially aligning said welding torch with respect to said nozzle;

(c) linearly moving said welding torch along the longitudinal axis of said nozzle;

(d) rotating said welding torch about the longitudinal axis of said nozzle; and, (e) synchronizing and controlling the linear and rotary movement of said welding torch to move said discharge end of said welding torch along the perimeter of the discharge end of said nozzle thereby welding said discharge end of said nozzle to the vessel.

15. The method as set forth in claim 14 further comprising the step of cutting the said discharge end of said nozzle along a bias.

16. The method as set forth in claim 14 further comprising the step of insetting the said discharge end of said nozzle a slight distance from the inside surface of said vessel.

17. The method as set forth in claim 14 further comprising the step of projecting the said discharge end of said nozzle into said vessel.

18. The method as set forth in claim 14 wherein said step of supporting said welding torch comprises the step of clamping said torch to said nozzle.

19. The method as set forth in claim 18 wherein said step of aligning said welding torch comprises the step of keying said torch with respect to said nozzle.

20. The method as set forth in claim 19 wherein said step of synchronizing and controlling the movement of said torch comprises the step of automatically controlling such movement via computer.

21. The method as set forth in claim 14 further comprising the step of supplying powdered filler metal to said welding torch for furnishing said powdered metal to the weld bead.

* * * * *

UNITED STATES PATENT AND TRADEMARK OFFICE
CERTIFICATE OF CORRECTION

PATENT NO. : 5,198,635

DATED : March 30, 1993

INVENTOR(S) : R. A. Dankovic, et al.

It is certified that error appears in the above-identified patent and that said Letters Patent is hereby corrected as shown below:

Column 4, line 64, after "claim", insert - - 1 - -.

Signed and Sealed this

Twenty-eighth Day of December, 1993

Attest:

BRUCE LEHMAN

*Attesting Officer* *Commissioner of Patents and Trademarks*